(12) United States Patent
Hall et al.

(10) Patent No.: US 8,436,618 B2
(45) Date of Patent: May 7, 2013

(54) MAGNETIC FIELD DEFLECTOR IN AN INDUCTION RESISTIVITY TOOL

(75) Inventors: David R. Hall, Provo, UT (US); Clint Cook, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 478 days.

(21) Appl. No.: 12/614,635

(22) Filed: Nov. 9, 2009

(65) Prior Publication Data

US 2010/0052689 A1 Mar. 4, 2010

Related U.S. Application Data

(63) Continuation-in-part of application No. 12/550,501, filed on Aug. 31, 2009, which is a continuation-in-part of application No. 12/473,416, filed on May 28, 2009, which is a continuation-in-part of application No. 12/341,771, filed on Dec. 22, 2008, now Pat. No. 7,898,259, which is a continuation-in-part of application No. 11/776,447, filed on Jul. 11, 2007, now Pat. No. 7,598,742, application No. 12/614,635, which is a continuation-in-part of application No. 11/676,494, filed on Feb. 19, 2007, now Pat. No. 7,265,649, which is a continuation-in-part of application No. 11/687,891, filed on Mar. 19, 2007, now Pat. No. 7,301,429.

(60) Provisional application No. 60/914,619, filed on Apr. 27, 2007.

(51) Int. Cl.
*G01V 3/10* (2006.01)

(52) U.S. Cl.
USPC .......................................................... 324/339

(58) Field of Classification Search ........................ None
See application file for complete search history.

(56) References Cited

U.S. PATENT DOCUMENTS

| | | | |
|---|---|---|---|
| 3,960,692 A | 6/1976 | Weyl et al. | |
| 4,302,722 A | 11/1981 | Gianzero | |
| 4,563,714 A | 1/1986 | Takeuchi | |
| 4,648,627 A | 3/1987 | Reimert | |
| 4,766,384 A | 8/1988 | Kleinberg et al. | |
| 4,785,247 A | 11/1988 | Meador et al. | |
| 4,808,929 A | 2/1989 | Oldigs | |
| 4,839,644 A | 6/1989 | Safinya et al. | |
| 4,881,988 A | 11/1989 | Bonser | |
| 4,933,640 A | 6/1990 | Kuckes | |
| 4,980,643 A | 12/1990 | Gianzero et al. | |
| 5,045,795 A | 9/1991 | Gianzero et al. | |
| 5,081,419 A | 1/1992 | Meador et al. | |
| 5,089,779 A | 2/1992 | Rorden | |
| 5,095,272 A | 3/1992 | Sinclair | |
| 5,138,263 A | 8/1992 | Towle | |
| 5,428,293 A | 6/1995 | Sinclair et al. | |
| 5,442,294 A | 8/1995 | Rorden | |
| 5,448,227 A | 9/1995 | Orban et al. | |
| 5,463,319 A * | 10/1995 | Chesnutt et al. | ............... 324/339 |
| 5,467,832 A | 11/1995 | Orban et al. | |

(Continued)

*Primary Examiner* — Jermele M Hollington
(74) *Attorney, Agent, or Firm* — Brinks Hofer Gilson & Lione (57) ABSTRACT

A downhole induction resistivity assembly comprises a mandrel. Disposed around the mandrel are coils of wire disposed circumferentially around magnetic field concentrators. The coils of wire and the magnetic field concentrators are disposed on an outer diameter of the mandrel. A magnetic field deflector, of magnetic permeability greater than the mandrel, is disposed intermediate the coils and the mandrel.

19 Claims, 9 Drawing Sheets

U.S. PATENT DOCUMENTS

| | | | |
|---|---|---|---|
| 5,491,488 A | 2/1996 | Wu | |
| 5,530,358 A | 6/1996 | Wisler | |
| 5,594,343 A | 1/1997 | Clark et al. | |
| 5,606,260 A | 2/1997 | Giordano et al. | |
| 5,668,475 A | 9/1997 | Orban et al. | |
| 5,747,743 A | 5/1998 | Kato et al. | |
| 5,833,019 A | 11/1998 | Gynz-Rekowski | |
| 5,905,379 A | 5/1999 | Orban et al. | |
| 5,936,913 A | 8/1999 | Gill et al. | |
| 6,068,394 A | 5/2000 | Dublin | |
| 6,082,484 A | 7/2000 | Molz et al. | |
| 6,100,696 A | 8/2000 | Sinclair | |
| 6,114,972 A | 9/2000 | Smith | |
| 6,163,155 A | 12/2000 | Bittar | |
| 6,191,586 B1 | 2/2001 | Bittar | |
| 6,218,842 B1 | 4/2001 | Bittar et al. | |
| 6,259,030 B1 | 7/2001 | Tanigawa et al. | |
| 6,281,801 B1 | 8/2001 | Cherry et al. | |
| 6,285,014 B1 | 9/2001 | Beck et al. | |
| 6,297,639 B1 | 10/2001 | Clark et al. | |
| 6,344,746 B1 | 2/2002 | Chunduru et al. | |
| 6,359,438 B1 | 3/2002 | Bittar | |
| 6,422,336 B1 | 7/2002 | Abele et al. | |
| 6,476,609 B1 | 11/2002 | Bittar | |
| 6,538,447 B2 | 3/2003 | Bittar | |
| 6,577,129 B1 | 6/2003 | Thompson et al. | |
| 6,586,939 B1 | 7/2003 | Fanini et al. | |
| 6,614,360 B1 | 9/2003 | Leggett et al. | |
| 6,630,831 B2 | 10/2003 | Amini | |
| 6,641,434 B2 | 11/2003 | Boyle et al. | |
| 6,646,441 B2 | 11/2003 | Thompson et al. | |
| 6,655,452 B2 | 12/2003 | Zillinger | |
| 6,667,620 B2 | 12/2003 | Homan et al. | |
| 6,670,880 B1 | 12/2003 | Hall et al. | |
| 6,671,224 B1 | 12/2003 | Pabon | |
| 6,677,756 B2 | 1/2004 | Fanini et al. | |
| 6,680,613 B2 | 1/2004 | Rosthal et al. | |
| 6,688,396 B2 | 2/2004 | Floerke et al. | |
| 6,690,170 B2 | 2/2004 | Homan et al. | |
| 6,703,837 B1 | 3/2004 | Wisler et al. | |
| 6,765,385 B2 | 7/2004 | Sinclair et al. | |
| 6,768,407 B2 | 7/2004 | Kohda et al. | |
| 6,768,700 B2 | 7/2004 | Veneruso et al. | |
| 6,777,940 B2 | 8/2004 | Macune | |
| 6,810,331 B2 | 10/2004 | Bittar et al. | |
| 6,814,162 B2 | 11/2004 | Moran et al. | |
| 6,849,195 B2 | 2/2005 | Basheer et al. | |
| 6,900,640 B2 | 5/2005 | Fanini et al. | |
| 6,913,095 B2 | 7/2005 | Krueger | |
| 6,915,701 B1 | 7/2005 | Tarler | |
| 6,975,243 B2 | 12/2005 | Clark et al. | |
| 6,984,980 B2 | 1/2006 | Kruspe et al. | |
| 7,026,820 B2 | 4/2006 | Xiao et al. | |
| 7,028,543 B2 | 4/2006 | Hardage et al. | |
| 7,031,839 B2 | 4/2006 | Tabarovsky et al. | |
| 7,032,707 B2 | 4/2006 | Egerev et al. | |
| 7,038,457 B2 | 5/2006 | Chen et al. | |
| 7,040,003 B2 | 5/2006 | Hall et al. | |
| 7,046,009 B2 | 5/2006 | Itskovich | |
| 7,057,392 B2 | 6/2006 | Wang et al. | |
| 7,064,676 B2 | 6/2006 | Hall et al. | |
| 7,091,810 B2 | 8/2006 | Hall et al. | |
| 7,095,232 B2 | 8/2006 | Haber et al. | |
| 7,098,657 B2 | 8/2006 | Guilhamat et al. | |
| 7,098,858 B2 | 8/2006 | Bittar et al. | |
| 7,116,199 B2 | 10/2006 | Hall et al. | |
| 7,138,803 B2 | 11/2006 | Bittar | |
| 7,138,897 B2 | 11/2006 | Minerbo et al. | |
| 7,141,981 B2 | 11/2006 | Folberth et al. | |
| 7,150,316 B2 | 12/2006 | Itskovich | |
| 7,150,317 B2 | 12/2006 | Barolak et al. | |
| 7,193,420 B2 | 3/2007 | Chen | |
| 7,212,132 B2 | 5/2007 | Gao et al. | |
| 7,212,173 B2 | 5/2007 | Chen et al | |
| 7,265,649 B1 | 9/2007 | Hall et al. | |
| 7,284,605 B2 | 10/2007 | Clark et al. | |
| 7,301,429 B1 | 11/2007 | Hall et al. | |
| 7,334,661 B2 | 2/2008 | Pabon et al. | |
| 7,360,610 B2 | 4/2008 | Hall et al. | |
| 7,477,114 B2 | 1/2009 | Pivit et al. | |
| 7,525,315 B2 | 4/2009 | Fredette et al. | |
| 7,541,813 B2 | 6/2009 | Synder et al. | |
| 7,551,516 B2 | 6/2009 | Harmon | |
| 7,588,082 B2 * | 9/2009 | Lasater | 166/255.1 |
| 7,598,742 B2 | 10/2009 | Synder et al. | |
| 7,639,562 B2 | 12/2009 | Patterson et al. | |
| 7,730,972 B2 | 6/2010 | Hall et al. | |
| 7,777,644 B2 | 8/2010 | Madhavan et al. | |
| 7,884,611 B1 | 2/2011 | Hall et al. | |
| 7,898,259 B2 | 3/2011 | Hall et al. | |
| 7,902,955 B2 * | 3/2011 | Veneruso et al. | 336/212 |
| 7,980,331 B2 * | 7/2011 | Hall et al. | 175/320 |
| 7,994,791 B2 | 8/2011 | Hall et al. | |
| 8,030,936 B2 * | 10/2011 | Hall et al. | 324/339 |
| 2003/0090269 A1 * | 5/2003 | Fanini et al. | 324/339 |
| 2003/0151408 A1 | 8/2003 | Kruspe et al. | |
| 2004/0104794 A1 | 6/2004 | Kohda et al. | |
| 2004/0113626 A1 | 6/2004 | Wang et al. | |
| 2005/0045343 A1 | 3/2005 | Bixenman et al. | |
| 2005/0116718 A1 * | 6/2005 | Chen et al. | 324/338 |
| 2005/0152219 A1 | 7/2005 | Garcia-Osuna et al. | |
| 2005/0189947 A1 | 9/2005 | Haugland | |
| 2006/0033502 A1 | 2/2006 | Bittar | |
| 2006/0077757 A1 | 4/2006 | Cox et al. | |
| 2006/0158296 A1 | 7/2006 | Hall et al. | |
| 2006/0192561 A1 | 8/2006 | Chesser et al. | |
| 2006/0197629 A1 | 9/2006 | Pivit et al. | |
| 2006/0208383 A1 | 9/2006 | Aisenbrey | |
| 2006/0267200 A1 | 11/2006 | Mickle et al. | |
| 2007/0017705 A1 * | 1/2007 | Lasater | 175/61 |
| 2007/0257679 A1 * | 11/2007 | Fanini et al. | 324/366 |
| 2008/0224707 A1 | 9/2008 | Wisler et al. | |
| 2008/0265894 A1 | 10/2008 | Snyder et al. | |
| 2009/0025982 A1 | 1/2009 | Hall et al. | |
| 2009/0050372 A1 | 2/2009 | Hall et al. | |
| 2009/0160445 A1 | 6/2009 | Hall et al. | |
| 2009/0160447 A1 * | 6/2009 | Hall et al. | 324/339 |
| 2009/0160448 A1 * | 6/2009 | Hall et al. | 324/339 |
| 2009/0230969 A1 * | 9/2009 | Hall et al. | 324/343 |
| 2009/0267790 A1 * | 10/2009 | Hall et al. | 340/855.3 |
| 2010/0052689 A1 | 3/2010 | Hall et al. | |
| 2010/0295547 A1 | 11/2010 | Hall et al. | |
| 2011/0068797 A1 | 3/2011 | Hall et al. | |
| 2011/0227578 A1 | 9/2011 | Hall et al. | |
| 2012/0121960 A1 * | 5/2012 | Hall et al. | 429/120 |

* cited by examiner

MAGNETIC FIELD DEFLECTOR IN AN INDUCTION RESISTIVITY TOOL

CROSS REFERENCE TO RELATED APPLICATIONS

This application is a continuation-in-part of U.S. patent application Ser. No. 12/550,501 filed on Aug. 31, 2009, which is a continuation-in-part of U.S. patent application Ser. No. 12/473,416 filed on May 28, 2009, which is a continuation-in-part of U.S. patent application Ser. No. 12/341,771 filed on Dec. 22, 2008 and is now U.S. Pat. No. 7,898,259 issued on Mar. 1, 2011, which is a continuation-in-part of U.S. patent application Ser. No. 11/776,447 filed on Jul. 11, 2007 and is now U.S. Pat. No. 7,598,742 issued on Oct. 6, 2009, which claims priority to Provisional U.S. Patent Application No. 60/914,619 filed on Apr. 27, 2007, abandoned on Jul. 22, 2007, and entitled "Resistivity Tool." U.S. patent application Ser. No. 12/341,771 is also a continuation-in-part of U.S. patent application Ser. No. 11/687,891 filed on Mar. 19, 2007 and now U.S. Pat. No. 7,301,429 issued on Nov. 27, 2007 is a continuation-in-part of U.S. patent application Ser. No. 11/676,494 filed on Feb. 19, 2007 and now U.S. Pat. No. 7,265,649 issued on Sep. 4, 2007. This Application is related to U.S. Provisional Application Ser. No. 61/073,190 abandoned on Oct. 7, 2008. All of the above mentioned references are herein incorporated by reference for all that they contain.

BACKGROUND

Electric resistivity of a downhole formation is often measured from a wireline in a well bore to analyze formation parameters. Induction resistivity tools induce a magnetic field into the formation; and thus, are different from laterolog resistivity systems, where an electric current is passed through the formation.

U.S. Pat. No. 6,677,756 to Fanini et al., which is herein incorporated by reference for all that it contains, discloses an induction tool for formation resistivity evaluations. The induction tool provides electromagnetic transmitters and sensors suitable for transmitting and receiving magnetic fields in radial directions.

U.S. Pat. No. 6,359,438 to Bittar, which is herein incorporated by reference for all that it contains, discloses a resistivity tool for use in a logging while drilling (LWD) system and includes a transmitter array with multiple transmitters positioned above a pair of receivers. The transmitters of the transmitter array are selectively energized, causing current to be induced in a collar of the resistivity tool.

U.S. Pat. No. 6,577,129 to Thompson et al., which is herein incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is herein incorporated by reference for all that it contains, discloses a multi mode resistivity tool for use in a logging-while-drilling system and includes an asymmetric transmitter design with multiple transmitters capable of generating electromagnetic signals at multiple depths of investigation.

U.S. Pat. No. 7,141,981 to Folbert et al., which is herein incorporated by reference for all that it contains, discloses a resistivity logging tool suitable for downhole use and includes a transmitter, and two spaced apart receivers. The measured resistivities at the two receivers are corrected based on measuring the responses of the receivers to a calibration signal.

U.S. Pat. No. 6,218,842 to Bittar et al., which is herein incorporated by reference for all that it contains, discloses a resistivity tool for use in LWD systems and includes an asymmetric transmitter design with multiple transmitters capable of generating electromagnetic (EM) signals at multiple frequencies.

U.S. Pat. No. 5,045,795 to Gianzero et al., which is herein incorporated by reference for all that it contains, discloses a coil array which is installed on a measurement while drilling (MWD) drill collar for use in a resistivity logging system. The drill collar is provided with upper and lower coil support rings. The support rings are toroids which support individual coil segments, and are connected by suitable magnetic shorting bars. The coil segments and shorting bars inscribe a specified solid angle or azimuthal extent.

U.S. Pat. No. 5,606,260 to Giordano et al., which is herein incorporated by reference for all that it contains, discloses a microdevice that is provided for measuring the electromagnetic characteristics of a medium in a borehole. The microdevice includes at least one emitting or transmitting coil and at least one receiving coil. The microdevice generates an A.C. voltage at the terminals of the transmitting coil and measures a signal at the terminals of the receiving coil. The microdevice also includes an E-shaped electrically insulating, soft magnetic material circuit serving as a support for each of the coils and is positioned adjacent to the medium in the borehole.

U.S. Pat. No. 6,100,696 to Sinclair, which is herein incorporated by reference for all that it contains, discloses a directional induction logging tool that is provided for measurement while drilling. This tool is preferably placed in a side pocket of a drill collar, and comprises transmitter and receiver coils and an electromagnetic reflector.

U.S. Pat. No. 6,163,155 to Bittar et al., which is herein incorporated by reference for all that it contains, discloses a downhole method and apparatus for simultaneously determining the horizontal resistivity, vertical resistivity, and relative dip angle for anisotropic earth formations.

U.S. Pat. No. 6,476,609 to Bittar et al., which is herein incorporated by reference for all that it contains, discloses an antenna configuration in which a transmitter antenna and a receiver antenna are oriented in nonparallel planes such that the vertical resistivity and the relative dip angle are decoupled.

U.S. Pat. No. 6,900,640 to Fanini et al., which is herein incorporated by reference for all that it contains, discloses a tool that provides electromagnetic transmitters and sensors suitable for transmitting and receiving magnetic fields in radial directions that are orthogonal to the tool's longitudinal axis with minimal susceptibility to errors associated with parasitic eddy currents induced in the metal components surrounding the transmitter and receiver coils.

BRIEF SUMMARY

In one aspect of the present invention a downhole induction resistivity assembly comprises a mandrel. Disposed around the mandrel are coils of wire disposed circumferentially around magnetic field concentrators. The coils of wire and the magnetic field concentrators are disposed on an outer diameter of the mandrel. A magnetic field deflector, which comprises a magnetic permeability greater than the mandrel, may be disposed intermediate the coils and the mandrel. The magnetic field concentrator may comprise a ferrite core.

In some embodiments of the invention, the magnetic field deflector may comprise a mu-metal, Hipernum, HyMu-80, permalloy, a magnetically soft alloy or sheet metal, or any material or alloy with a magnetic permeability greater than the mandrel. The deflector material may contain nickel, iron, manganese, molybdenum, silicon, magnetic material, carbon, or any combination thereof. The material may further comprise an alloy that comprises between 70% to 85% nickel and between 10% to 20% iron. The deflector may be annealed. The deflector may comprise a material with a higher magnetic permeability value than the magnetic permeability of the mandrel. The material my further have a magnetic permeability that is at least 100 times greater than the permeability of the mandrel.

In some embodiments, the magnetic field deflector may be disposed circumferentially at least once around the mandrel. The magnetic field deflector may be intermediate, or between, transmitter coils, bucking coils, or receiver coils. The magnetic field deflector may be disposed under a portion of the coils. The positioning of the magnetic field deflector may comprise spanning a space between a transmitter coil and a receiver coil. The magnetic field deflector may be disposed circumferentially around the entire length of the mandrel. The magnetic field deflector may comprise a sheet of material or wire/cable wrapper circumferentially around the mandrel. Strips of a magnetic field deflector may be disposed circumferentially around the mandrel adjacent to an end of a receiver coil.

In some embodiments, the mandrel may comprise a magnetic material. The mandrel may further comprise sections of magnetic and nonmagnetic material. A magnetic section may be position proximate a transmitter or receiver.

BRIEF DESCRIPTION OF THE DRAWINGS

FIG. 3b is a cross-sectional view of the embodiment of an induction transmitter of FIG. 3a.

DETAILED DESCRIPTION

Figure 1:
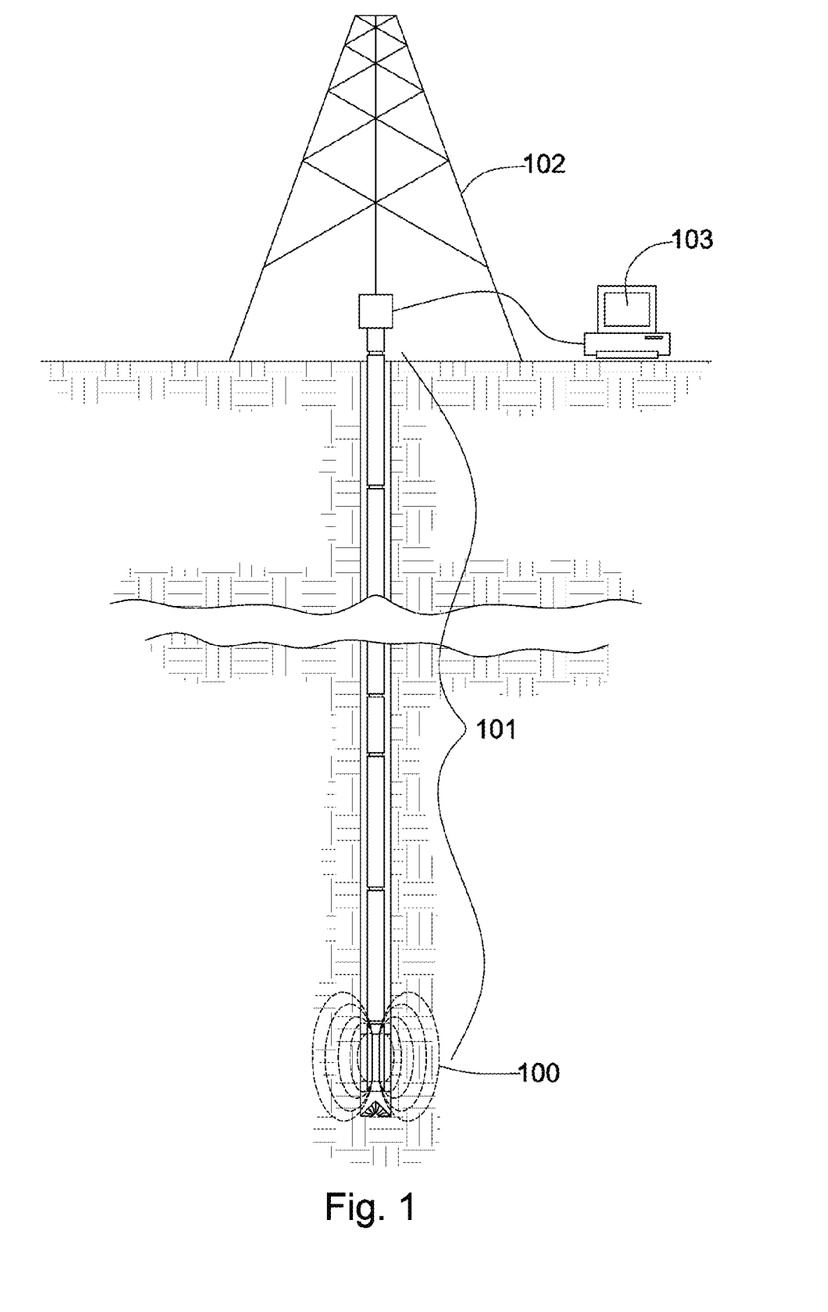
FIG. 1 is a cross-sectional diagram of an embodiment of a downhole induction resistivity assembly.

Referring now to FIG. 1, a downhole tool string 101 may be suspended by a derrick 102. The downhole tool string 101 may comprise one or more downhole components 100 linked together in the downhole tool string 101 and in communication with surface equipment 103 through a downhole network. The downhole network may enable high-speed communication between devices connected to the downhole tool string 101, and the downhole network may facilitate the transmission of data between sensors and sources. The data gathered by the downhole instrumentation may be processed downhole, may be transmitted to the surface for processing, may be filtered downhole and then transmitted to the surface for processing, may be compressed downhole and then transmitted to the surface for processing, or combinations thereof. In some embodiments, the data may be stored downhole and dumped to uphole equipment when the downhole tool string is tripped out of the wellbore.

Figure 2:
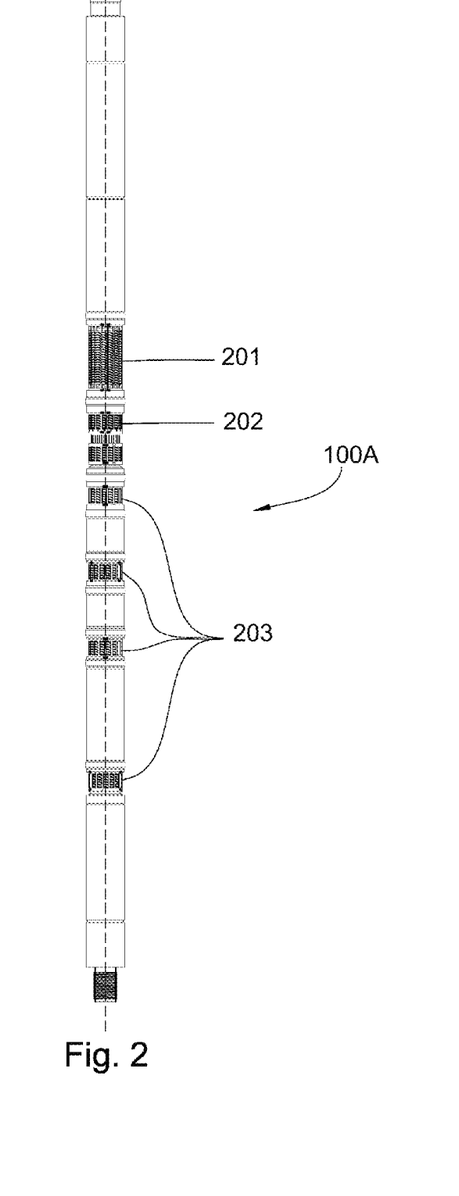
FIG. 2 is an orthogonal view of an embodiment of induction resistivity assembly.

FIG. 2 illustrates an embodiment of a tool string component 100A. The tool string component 100A may comprise an induction transmitter 201 and a plurality of induction receivers 202 and 203. The induction receivers 202 and 203 may be placed in a variety of orientations with respect to each other and to the induction transmitter 201. The induction transmitter 201 is adapted to send an induction signal into a formation, which generates an induced field in the formation surrounding the well bore. The induction receivers 202 and 203 are adapted to sense various attributes of the induced formation field. These attributes may include among others, some, or all of the following: frequency, amplitude, or phase. The induction transmitter 201 and the induction receivers 202 and 203 may be powered by batteries, a turbine generator, or from the downhole network. The induction receivers 202 and 203 may also be passive. In some embodiments, there may be several induction transmitters 201 located along the length of the tool string component 100A. In some embodiments, the additional transmitters 201 may be used to calibrate measurements, such as is common in borehole compensation techniques.

Figure 3A:
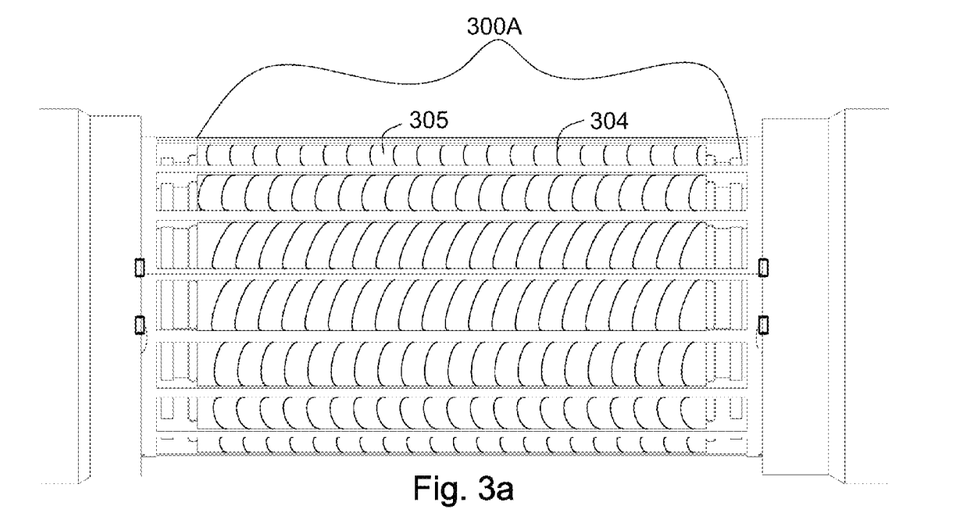
FIG. 3a is an orthogonal view of an embodiment of an induction transmitter.

FIG. 3a is an orthogonal diagram of an embodiment of a tool string component having an induction transmitter 300A. The transmitter 300 may comprise coils of electrically conductive material 304 wrapped around a magnetic field concentrator 305. The coil wrapped magnetic field concentrators 305 may be disposed on an outer surface of a mandrel. The mandrel may be a drill pipe, tool string component, or combination thereof. The magnetic field concentrator 305 may comprise a magnetically conducting core where a wire is wrapped around its outer surface or a magnetically conducting annular ring where the wire is disposed within a ring's recess.

Figure 3B:
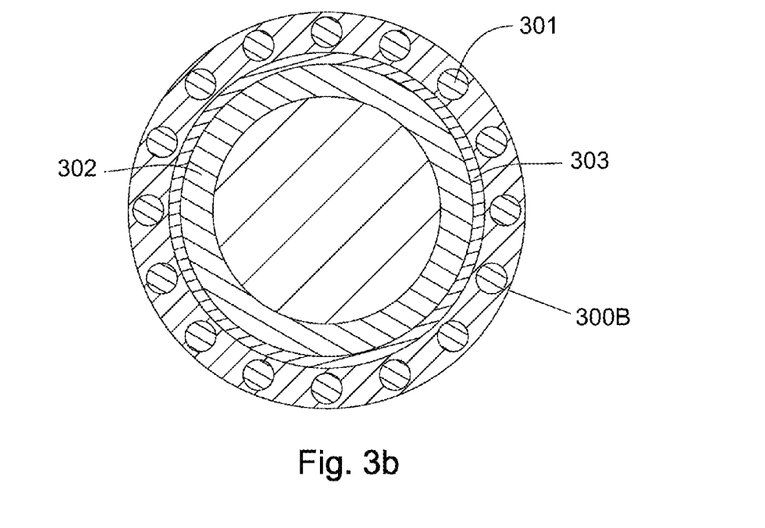

FIG. 3b is a cross-sectional diagram of a tool string component illustrating an embodiment of an induction transmitter 300B having a magnetic field deflector 303. Transmitter coils 301 may be disposed circumferentially around a mandrel 302. A magnetic field deflector 303 may be disposed circumferentially intermediate, or between, the mandrel 302 and the transmitter coils 301. The magnetic field deflector 303 may comprise a material that has a higher magnetic permeability than the magnetic permeability of the mandrel 302. The magnetic field deflector 303 may comprise mu-metal, Hipernum, HyMu-80, permalloy, a magnetically soft alloy, or sheet metal. In some embodiments, the magnetic field deflector 303 may comprise any material that has a relative magnetic permeability at least 100 times greater than the magnetic permeability of the mandrel 302. The magnetic field deflector 303 may comprise alloys of iron and nickel. The magnetic field deflector 303 may be annealed. Annealing of the magnetic field deflector 303 increases the magnetic permeability of the material by aligning the grains of the metal. The higher magnetic permeability may provide a path of least resistance for a magnetic field around the mandrel 302, thereby shielding the mandrel 302 from the magnetic field. In some embodiments, the magnetic field deflector 303 may be segmented.

As the transmitter coils 301 of the induction transmitters 300B carry an electric current, an magnetic field associated with the current is concentrated by the magnetic field concentrators (not shown in FIG 3b). The transmitter coils 301 and the magnetic field concentrators work together to control the parameters of the induced field. The magnetic field deflector 303 is disposed more centrally to the mandrel's central axis than both the transmitter coils 301 and the magnetic concentrators 305 and may insulate, or even isolate, the mandrel 302 from the induced magnetic field. Preferably, the transmitter coils 301 are wrapped around the magnetic field concentrator.

Figure 4A:
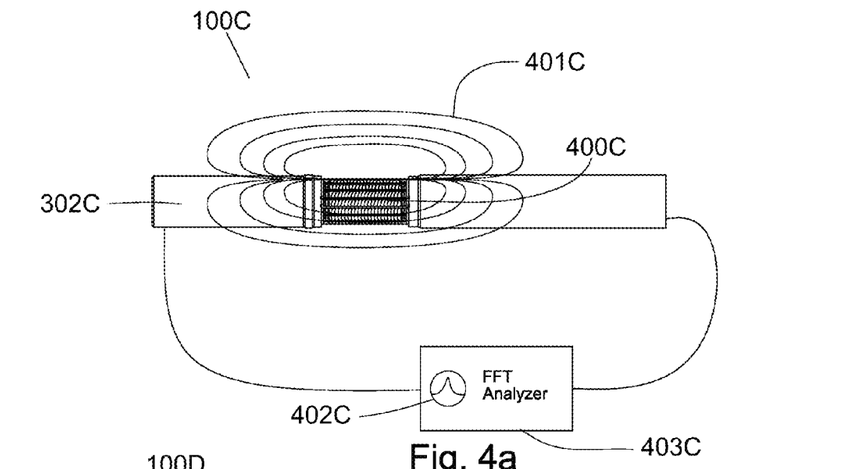
FIG. 4a is an orthogonal view of a downhole tool string.

FIG. 4a is a perspective diagram of a downhole tool string component 100C. As an induction transmitter 400C produces a magnetic field 401C, a current 402C is induced in a mandrel 302C. The induced current 402C can be measured by a spectrum analyzer 403 (, which may be attached to the ends of the mandrel 302C. The induced current 402C in the mandrel 302C produces a magnetic field that can be picked up by receiver coils on the drill pipe, thereby interfering with acquiring resistivity measurements.

Figure 4B:
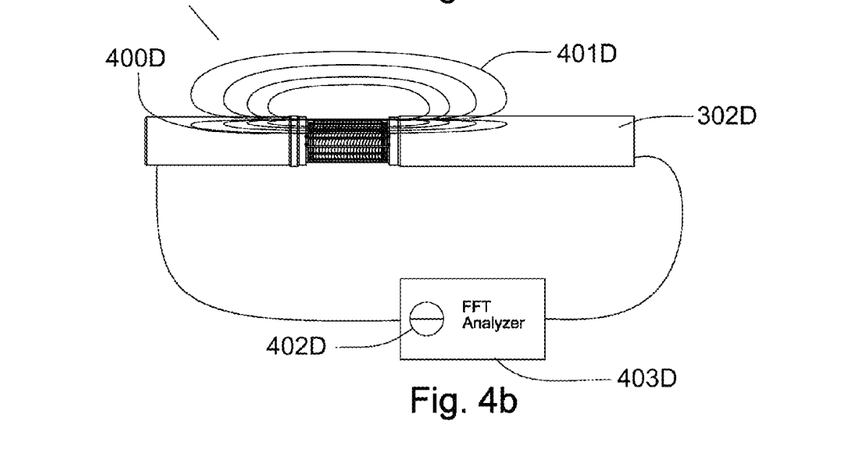
FIG. 4b is an orthogonal view a perspective diagram of an embodiment of a magnetic field deflector.

FIG. 4b discloses a downhole tool string component 100D having a magnetic field deflector positioned intermediate, or between, transmitter coils 400D and a mandrel 302D that reduces or eliminates induced currents in the mandrel 302D. The spectrum analyzer 403D may not detect a current 402D induced on the mandrel 302D. Decreasing or eliminating the magnetic field produced by the mandrel 302D increases the sensitivity of receiver coils to magnetic fields emanating from the formation.

Figure 5A:
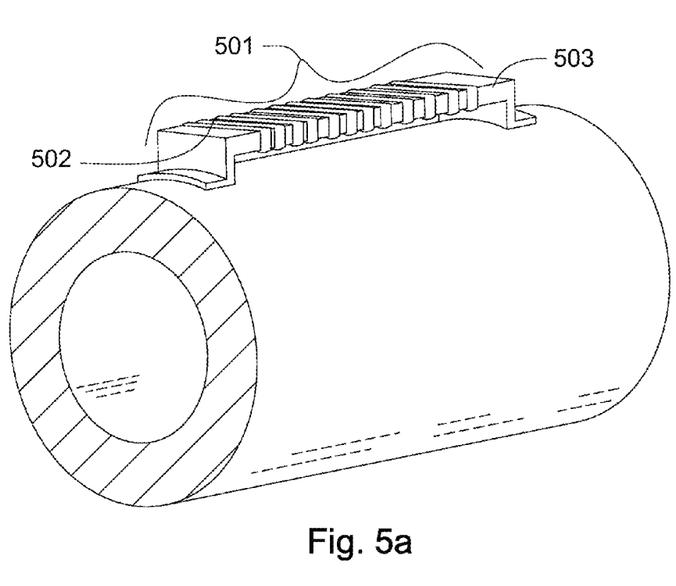
FIG. 5a is a perspective diagram of an embodiment of an induction transmitter or receiver.

FIG. 5a is a perspective diagram of an embodiment of an induction transmitter or receiver 501. The induction transmitter or receiver 501 may comprise wrapping an electrically conductive wire 502 around a magnetic field concentrator 503. The magnetic field concentrator 503 may comprise a ferrite core. As the electively conductive wire 502 generates a magnetic field, the magnetic field is concentrated by the magnetic field concentrator 503, and the magnetic field is concentrated in the core of the magnetic field concentrator 503.

Figure 5B:
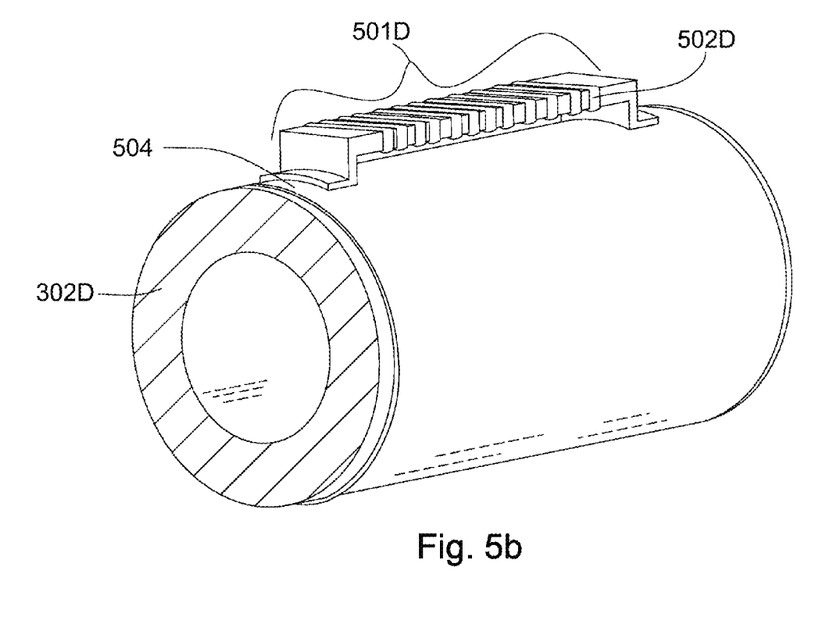
FIG. 5b is a perspective diagram of an embodiment of a magnetic field deflector.

FIG. 5b is a perspective diagram of an embodiment of an induction transmitter 501D having a magnetic field deflector 504. The magnetic field deflector 504 may be disposed circumferentially around a mandrel 302D. The magnetic field deflector 504 may be disposed intermediate, or between, at least one coil 502D and the mandrel 302D. The magnetic field deflector 504 may span more or less area than the area under the transmitter or receiver coils 501D.

Figure 6:
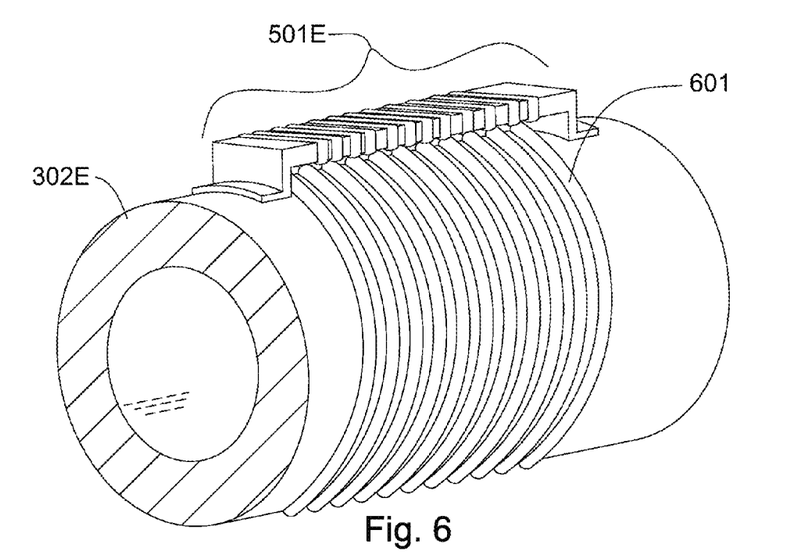
FIG. 6 is a perspective diagram of an embodiment of a magnetic field deflector.

FIG. 6 is a perspective diagram of an embodiment of a magnetic field deflector 601. In this embodiment the magnetic field deflector 601 may comprise a wire or cable 601 wrapped circumferentially at least once around the mandrel 302E. The magnetic field deflector 601 may be disposed intermediate, or between, the induction transmitter or receiver 501E and the mandrel 302E. The magnetic field deflector 601 coils may be spaced apart or tightly wound. In some embodiments, the wire or cable turns are in electrical communication with each other so the entire magnetic field deflector 601 acts as a sheet.

Figure 7:
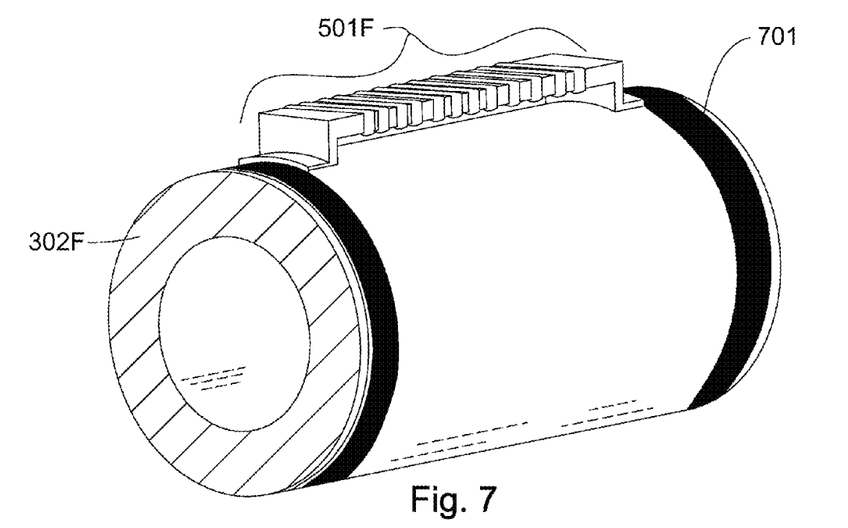
FIG. 7 is a perspective diagram of an embodiment of a magnetic field deflector.

FIG. 7 is a perspective diagram of an embodiment of a magnetic field deflector 701. A magnetic field deflector 701 may be disposed circumferentially around the mandrel 302 F such that the magnetic field deflector 701 is adjacent the ends of the induction transmitter or receiver 501F.

Figure 8:
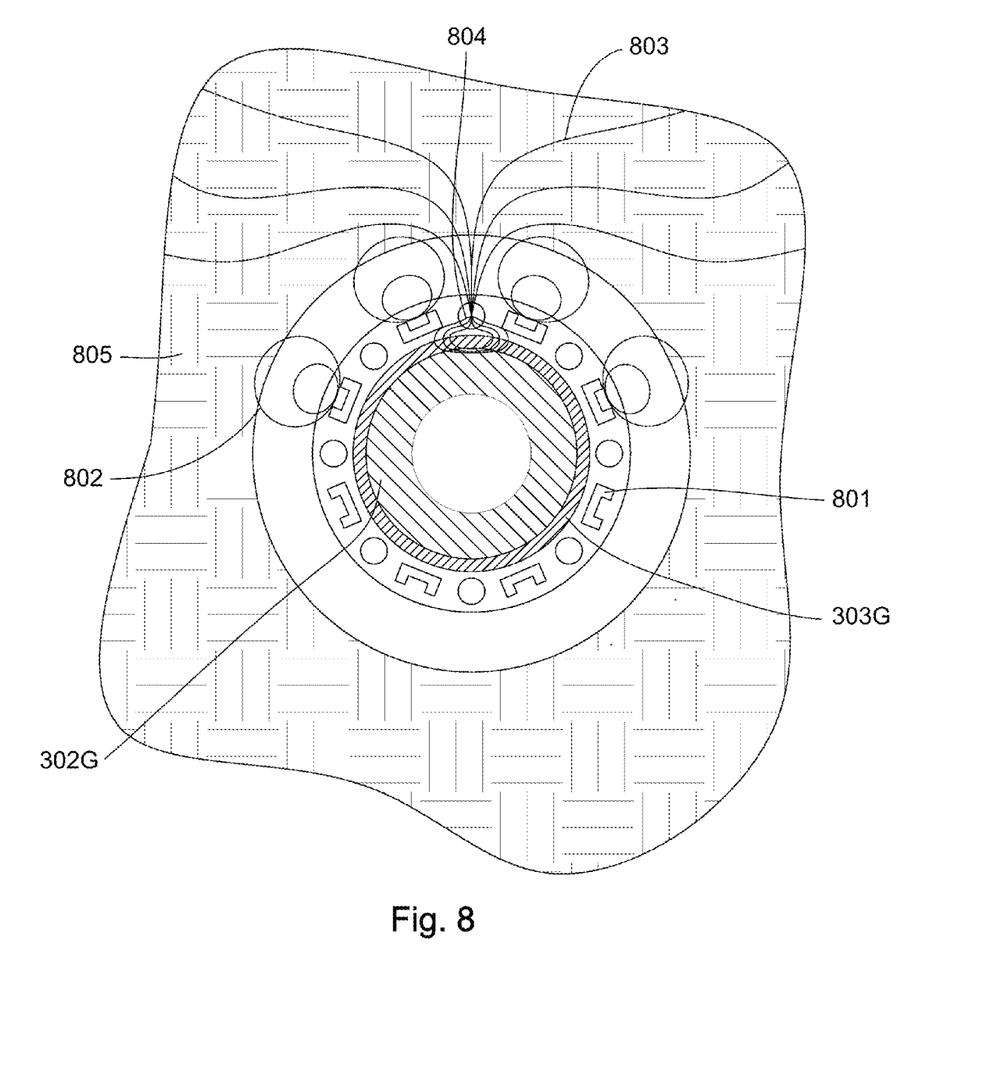
FIG. 8 is a cross-sectional diagram of an embodiment of a magnetic field deflector.

FIG. 8 is a cross-sectional diagram of an embodiment of a magnetic field deflector. A transmitter coil may comprise a bucking coil 801. The bucking coil 801 induces a magnetic field 802 which pushes a magnetic field 803 produced by other transmitter coils 804 into the formation 805. A deflector 303G may be disposed intermediate, or between, the mandrel 302G and the bucking coil 801.

Figure 9:
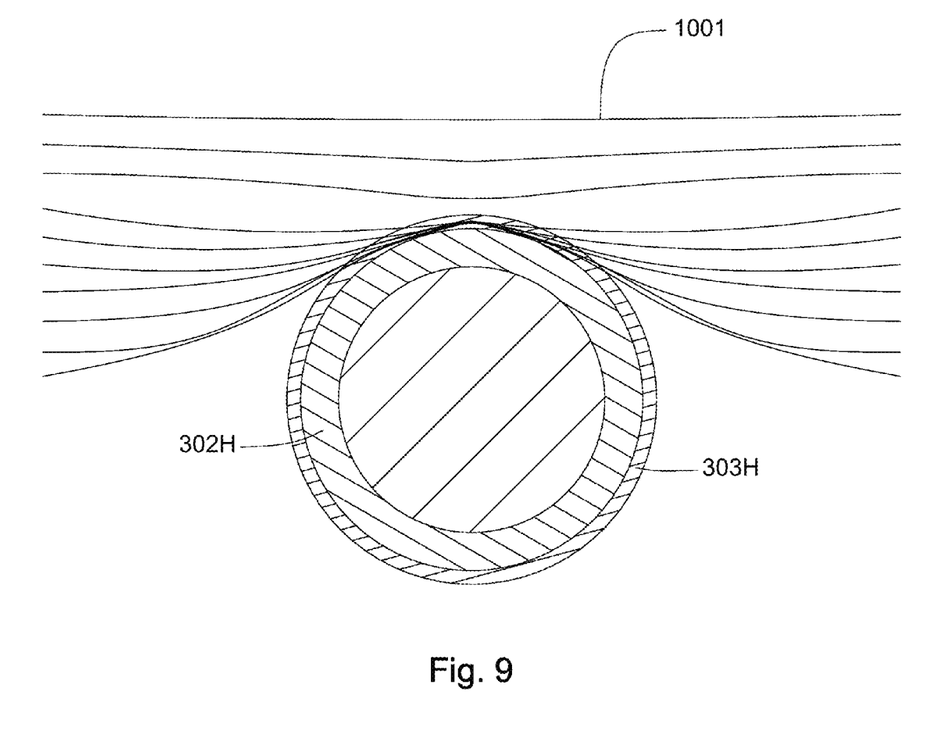
FIG. 9 is a cross-sectional diagram of an embodiment of a magnetic field deflector.

FIG. 9 is a cross-sectional diagram of an embodiment of a magnetic field deflector 303H. The magnetic field lines 1001 depicted in the diagram follow a path of least resistance. The magnetic field deflector 303H comprises a material of higher magnetic permeability than the magnetic permeability of the mandrel 302H such that the magnetic field lines 1001 travel preferentially through the deflector 303H instead of the mandrel 302H.

Figure 10:
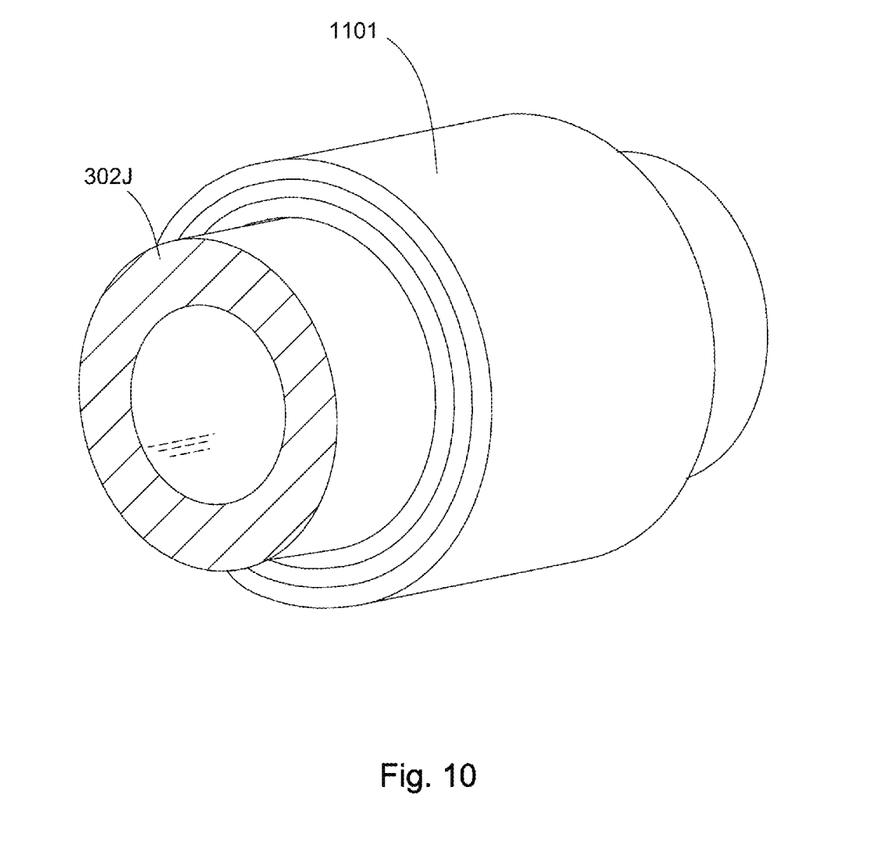
FIG. 10 is a perspective diagram of an embodiment of a magnetic deflector disposed on a mandrel.

FIG. 10 is a perspective diagram of an embodiment of a magnetic field deflector 1101 disposed on a mandrel 302J. The deflector 1101 may be disposed circumferentially around the mandrel 302J at least once. In FIG 10 multiple layers are depicted. Additional layers provide more shielding and decrease the induced field in the mandrel 302J.

In some embodiments, the magnetic deflector may be electrically isolated from the mandrel. The magnetic deflector may also be segmented axially or circumferentially around the outer diameter of the mandrel.

Whereas the present invention has been described in particular relation to the drawings attached hereto, it should be understood that other and further modifications apart from those shown or suggested herein, may be made within the scope and spirit of the present invention.

What is claimed is:

1. A downhole induction resistivity assembly, comprising:
    a mandrel having an outer surface and a first magnetic permeability;
    a magnetic field concentrator disposed on the outer surface of the mandrel;
    a coil of wire disposed around the magnetic field concentrator with at least a portion of the coil of wire being disposed between the magnetic field concentrator and the mandrel; and
    a magnetic field deflector disposed between the outer surface of the mandrel and the coil, the magnetic field deflector having a second magnetic permeability greater than the first magnetic permeability.

2. The downhole induction resistivity assembly of claim 1, wherein the magnetic field deflector comprises a material selected from the group consisting of mu-metal, Hipernum, HyMu-80, permalloy, magnetically soft alloy, and sheet metal.

3. The downhole induction resistivity assembly of claim 1, wherein the magnetic field deflector comprises an alloy containing a material selected from the group consisting of nickel, iron, manganese, molybdenum, silicon, and carbon.

4. The downhole induction resistivity assembly of claim 3, wherein the alloy has between 70% and 85% nickel by weight and between 10% and 20% iron by weight.

5. The downhole induction resistivity assembly of claim 1, wherein the magnetic field deflector comprises a magnetically conductive material that is annealed.

6. The downhole induction resistivity assembly of claim 1, wherein the magnetic field deflector is disposed circumferentially around the mandrel.

7. The downhole induction resistivity assembly of claim 1, wherein the magnetic field deflector is disposed between a bucking coil and the mandrel.

8. The downhole induction resistivity assembly of claim 1, wherein a magnetic field line generated by a transmitter wraps around the mandrel through the magnetic field deflector.

9. The downhole induction resistivity assembly of claim 1 further comprising a transmitter coil disposed proximate the outer surface of the mandrel and a receiver coil disposed proximate the outer surface of the mandrel, wherein the magnetic field deflector is disposed circumferentially around the mandrel and spans a space between the transmitter coil and the receiver coil.

10. The downhole induction resistivity assembly of claim 1, wherein the magnetic field deflector comprises a sheet disposed circumferentially around the mandrel.

11. The downhole induction resistivity assembly of claim 1, wherein the magnetic field deflector is disposed under a portion of the coil of wire.

12. The downhole induction resistivity assembly of claim 1, wherein the magnetic field deflector is disposed circumferentially around the entire length of the mandrel.

13. The downhole induction resistivity assembly of claim 1, wherein the mandrel comprises a magnetic material.

14. The downhole induction resistivity assembly of claim 1, wherein the mandrel comprises sections of magnetic and non-magnetic material.

15. The downhole induction resistivity assembly of claim 1 further comprising at least one of a transmitter and a receiver, wherein the magnetic section of the mandrel is positioned proximate at least one of the transmitter and the receiver.

16. The downhole induction resistivity assembly of claim 1 further comprising a receiver coil, wherein the magnetic field deflector is disposed circumferentially around the mandrel adjacent to an end of the receiver coil.

17. The downhole induction resistivity assembly of claim 1, wherein the magnetic field deflector comprises a material with having a higher magnetic permeability than the magnetic permeability of the mandrel.

18. The downhole induction resistivity assembly of claim 1, wherein the coil adjacent the mandrel comprises transmitter coils and receiver coils.

19. The downhole induction resistivity assembly of claim 1, wherein the magnetic field concentrator comprises a ferrite core.

* * * * *